United States Patent
Khisti et al.

(10) Patent No.: US 12,418,412 B2
(45) Date of Patent: Sep. 16, 2025

(54) SECURE AND ROBUST FEDERATED LEARNING SYSTEM AND METHOD BY MULTI-PARTY HOMOMORPHIC ENCRYPTION

(71) Applicants: The Governing Council of the University of Toronto, Toronto (CA); Hitachi Solutions, Ltd., Tokyo (JP)

(72) Inventors: Ashish Khisti, Ontario (CA); Seyederfan Hosseini, Ontario (CA); Mitsuharu Oba, Tokyo (JP); Takushi Fujimoto, Tokyo (JP)

(73) Assignees: THE GOVERNING COUNCIL OF THE UNIVERSITY OF TORONTO, Toronto (CA); Hitachi Solutions, Ltd., Tokyo (JP)

( * ) Notice: Subject to any disclaimer, the term of this patent is extended or adjusted under 35 U.S.C. 154(b) by 344 days.

(21) Appl. No.: 17/722,561

(22) Filed: Apr. 18, 2022

(65) Prior Publication Data
US 2023/0017542 A1    Jan. 19, 2023

(30) Foreign Application Priority Data
Jul. 6, 2021 (JP) ................................. 2021-111934

(51) Int. Cl.
*H04L 9/08* (2006.01)
*G06N 20/00* (2019.01)
(Continued)

(52) U.S. Cl.
CPC .............. *H04L 9/088* (2013.01); *G06N 20/00* (2019.01); *H04L 9/008* (2013.01); *H04L 9/085* (2013.01); *H04L 9/30* (2013.01)

(58) Field of Classification Search
CPC ......... H04L 9/008; H04L 9/085; H04L 9/088; H04L 9/30–3093; G06N 20/00
See application file for complete search history.

(56) References Cited

U.S. PATENT DOCUMENTS 11,343,068 B2 * 5/2022 Nandakumar ......... G06N 3/084
2017/0310643 A1 * 10/2017 Hardy ..................... H04L 9/008
(Continued)

FOREIGN PATENT DOCUMENTS

| CN | 112149160 A | * | 12/2020 | ........... G06F 21/602 |
| CN | 113037460 B | * | 2/2023 | ........... G06F 21/602 |

OTHER PUBLICATIONS

Fang H, Qian Q. Privacy preserving machine learning with homomorphic encryption and federated learning. Future Internet. Apr. 8, 2021;13(4):94. (Year: 2021).*

(Continued)

*Primary Examiner* — Madhuri R Herzog
(74) *Attorney, Agent, or Firm* — Volpe Koenig

(57) ABSTRACT

It is provided a federated learning system for aggregating gradient information representing a result of training an AI model in an edge device, the federated learning system comprising the edge device and a server apparatus, the training module in the edge device being configured to generate an edge switch share in which the encrypted aggregated gradient is encrypted, and to transmit the generated edge switch share to the server apparatus, the encryption/decryption module in the server apparatus being configured to generate an encrypted aggregated gradient for decryption by adding edge switch shares received from the plurality of the edge device, generate an aggregated gradient by decrypting the generated encrypted aggregated gradient for decryption, and to transmit the generated aggregated gradient to the edge device, the training module in the edge device being configured to train the AI model by using the aggregated gradient received from the server apparatus.

7 Claims, 9 Drawing Sheets

$$ct = Enc(cpk, g_1 + g_2 + g_3) = Enc(cpk, g_1) + Enc(cpk, g_2) + Enc(cpk, g_3)$$

(51) Int. Cl.
    *H04L 9/00*         (2022.01)
    *H04L 9/30*         (2006.01)

(56) References Cited

U.S. PATENT DOCUMENTS

2020/0394518 A1*   12/2020   Sirdey .................... G06N 3/045
2023/0039182 A1*    2/2023   Cheng .................... G06N 3/098

OTHER PUBLICATIONS

B. Choi, J. yong Sohn, D.-J. Han, and J. Moon, "Communication computation efficient secure aggregation for federated learning", Dec. 10, 2020.

R. Xu, N. Baracaldo, Y. Zhou, A. Anwar, and H. Ludwig, "Hybridalpha: An efficient approach for privacy-preserving federated learning", AISec'19: Proceedings of the 12th ACM Workshop on Artificial Intelligence and Security, pp. 13-23, Nov. 11, 2019.

\* cited by examiner

SECURE AND ROBUST FEDERATED LEARNING SYSTEM AND METHOD BY MULTI-PARTY HOMOMORPHIC ENCRYPTION

CLAIM OF PRIORITY

The present application claims priority from Japanese patent application number. 2021-111934, filed on Jul. 6, 2021, the content of which is hereby incorporated by reference into this application.

BACKGROUND OF THE INVENTION

This invention relates to a federated learning system and a federated learning method.

As a machine learning technique, federated learning has been proposed as a machine learning method that can generate an AI model which is based on data on each edge device without aggregating pieces of data on distributed edge devices on a server (NPL 1). Federated learning is characterized by transmitting the data required for AI model generation (for example, gradient information) to the server in place of transmitting the original data from the edge device, and as a result, the privacy of data on the edge device can be protected.

However, when gradient information is transmitted to the server without maintaining confidentiality, the original data may be inferred from the gradient information obtained through eavesdropping. Therefore, there has been proposed a federated learning method which maintains the confidentiality of gradient information.

In NPL 1, there is described a technology for reducing traffic volume while maintaining the confidentiality of data based on a protocol called "secure multi-party computation." In NPL 2, there is described a technology for improving security by using homomorphic encryption in order to securely aggregate pieces of model update information on gradients, for example. In federated learning using homomorphic encryption, it is difficult to manage keys to be used for encryption and decryption, and in general, the keys are managed by a trusted third party (TTP).

NPL 1: B. Choi, J. yong Sohn, D.-J. Han, and J. Moon, "Communication computation efficient secure aggregation for federated learning", Dec. 10, 2020

NPL 2: R. Xu, N. Baracaldo, Y. Zhou, A. Anwar, and H. Ludwig, "Hybridalpha: An efficient approach for privacy-preserving federated learning", AlSec'19: Proceedings of the 12th ACM Workshop on Artificial Intelligence and Security, Pages 13-23, Nov. 11, 2019

SUMMARY OF THE INVENTION

In the technology as described in NPL 1, the quantity of communication can be reduced compared to the related art, but a large quantity of communication is still required. In addition, all edge nodes are required to exist during the AI model training process, and hence, when a part of the edge nodes become incommunicable, for example, and are not in a usable state, the training process does not continue.

In NPL 2, two problems arise as a result of using a TTP to manage the keys in federated learning. The first problem is that when the secret key managed by the TTP is leaked or the TTP colludes with the server during the federated learning, the gradient of each edge device may be decrypted and leaked. The second problem is that communication costs increase as a result of using a TTP.

An object of this invention is to provide a federated learning system which improves confidentiality and reduces communication costs without using a TTP.

The representative one of inventions disclosed in this application is outlined as follows. There is provided a federated learning system for aggregating gradient information representing a result of training an AI model in an edge device, the federated learning system comprising: the edge device configured to generate an AI model by training; and a server apparatus configured to collect the gradient information from the edge device, the edge device including: an edge key generation module configured to generate an edge key pair including an edge public key and an edge secret key; and a training module configured to train the AI model by using training data, the server apparatus including: a server key generation module configured to generate a key pair for decryption including a public key for decryption and a secret key for decryption; and an encryption/decryption module configured to execute data processing, the training module in the edge device being configured to generate an encrypted gradient in which the gradient information is encrypted by a common public key, and to transmit the generated encrypted gradient to the server apparatus, the encryption/decryption module in the server apparatus being configured to generate an encrypted aggregated gradient by adding encrypted gradients received from a plurality of the edge device, and to transmit the generated encrypted aggregated gradient to the edge device, the training module in the edge device being configured to generate an edge switch share in which the encrypted aggregated gradient is encrypted, and to transmit the generated edge switch share to the server apparatus, the encryption/decryption module in the server apparatus being configured to generate an encrypted aggregated gradient for decryption by adding edge switch shares received from the plurality of the edge device, generate an aggregated gradient by decrypting the generated encrypted aggregated gradient for decryption, and to transmit the generated aggregated gradient to the edge device, the training module in the edge device being configured to train the AI model by using the aggregated gradient received from the server apparatus.

According to the at least one aspect of this invention, the confidentiality can be improved and the communication costs can be reduced without using the TTP. Problems, configurations, and effects other than those described above are clarified by the following description of at least one embodiment of this invention.

DETAILED DESCRIPTION

Figure 1:
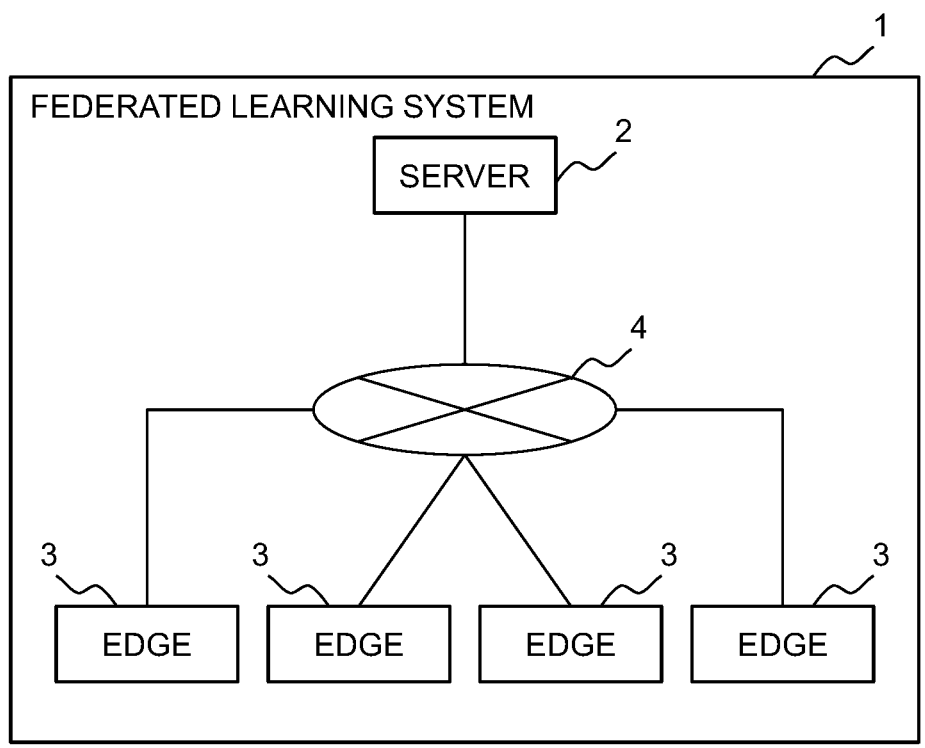
FIG. 1 is a diagram for illustrating an overall configuration of a federated learning system.

There is now given description of at least one embodiment of this invention with reference to the drawings. A federated learning system according to the at least one embodiment maintains, when gradient information (hereinafter sometimes referred to as "gradient") possessed by each edge device (hereinafter sometimes referred to as "edge") is aggregated in a server, confidentiality of the gradient of each edge by using homomorphic encryption. As a result, security of the gradient of each edge can be increased. In addition, by utilizing properties of secret distribution and homomorphic encryption during decryption, it is possible to securely decrypt the secret key of each edge without transmitting the secret key outside the edge.

As a preparation stage, the keys to be used for encryption and decryption in homomorphic encryption before training processing of an AI model are generated in the server and at each edge. At this time, share information (hereinafter sometimes referred to as "share") generated from the secret key of each edge is generated, and the generated share is distributed and shared at each edge. The share is used to decrypt the aggregated gradient generated in a process of the training processing of the AI model. Further, a key pair for decryption used at this time is generated and transmitted to each edge. In addition, a common public key is generated by aggregating the public key of each edge in the server, and the generated common public key is then transmitted to each edge.

During the training processing of the AI model, the gradients are determined by, for example, deep learning based on the training data of each edge. Next, the gradient of each edge is encrypted by the above-mentioned common public key and transmitted to the server. When the gradient of each edge is aggregated in the server, it is possible to generate a gradient aggregated in an encrypted state by simply adding the gradient of each edge by utilizing the properties of homomorphic encryption. When the aggregated gradient is decrypted and transmitted back to each edge, the aggregated gradient is determined by share information obtained from each edge for secret distribution, a key pair for decryption, the encrypted aggregated gradient, and a reconstruction coefficient of each edge. Each edge updates the AI model based on the aggregated gradient. As a result, each edge can securely transmit the gradient to the server while maintaining confidentiality, and generate an AI model that takes into account the gradient contents of other edges.

There is now given description of the at least one embodiment of this invention with reference to FIG. 1 to FIG. 9. It should be noted that the at least one embodiment is only an example for implementing this invention, and does not limit the technical scope of this invention.

In the following description, "computer program" may be used as the subject of a sentence. Each computer program is executed by a processor to execute predetermined processing while using a memory and communication ports (communication control device). Therefore, in sentences in which "computer program" is the subject, "processor" can be read in place of "computer program," and a computer including a processor can be understood as being the subject.

At least a part or all of the computer programs may be implemented by dedicated hardware. The computer programs may be modularized. The computer programs may be distributed by being fixed to a recording medium or may be distributed from a program delivery server via a communication network. The functions described later are implemented by the processor reading the computer programs and executing processing.

In addition, unless stated otherwise, the following description is based on the premise that the public key encryption system is a fully homomorphic encryption scheme, and that BFV is used for the fully homomorphic encryption scheme.

FIG. 1 is a diagram for illustrating an overall configuration of a federated learning system 1.

The federated learning system 1 includes, for example, a server 2 and a plurality of edges 3. Each edge 3 can communicate to and from the server 2 via a network (for example, the Internet) 4 on which confidentiality is not guaranteed. In the at least one embodiment, the number of edges is four, but the number of edges may be any number of two or more.

Figure 2:
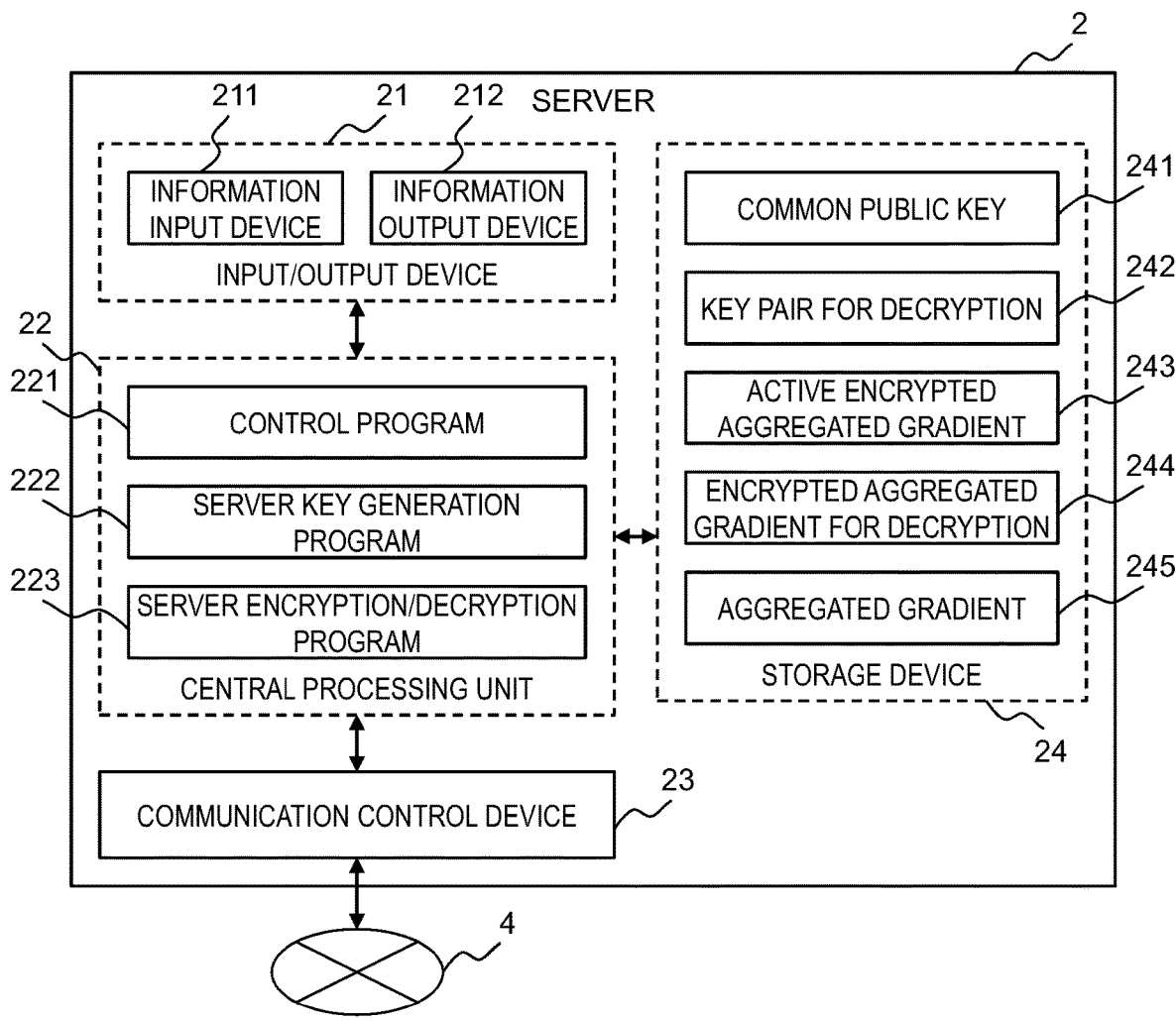
FIG. 2 is a block diagram for illustrating a configuration of a server.

FIG. 2 is a block diagram for illustrating a configuration example of hardware and software of the server 2.

The server 2 includes, for example, an input/output device 21, a central processing unit 22, a communication control device 23, and a storage device 24.

The input/output device 21 is a device which inputs and outputs information to and from a user. The input/output device 21 includes an information input device 211 and an information output device 212. Examples of the information input device 211 include a keyboard, a mouse, and a touch panel (none shown). Examples of the information output device 212 include a display and a printer (both not shown). The input/output device 21 may be a device which combines both an information input device and an information output device. The input/output device 21 may be a terminal coupled via the network 4 to the server 2. In this case, the server 2 has a function of a web server. The terminal accesses the server 2 by using a predetermined protocol (for example, http), and a web browser of the terminal implements a display function. In addition, the terminal may implement the display function by executing a dedicated application. The input/output device 21 may be an interface which outputs results of calculations by the server 2 to another computer system. In this way, the input/output device 21 can adopt various forms.

The central processing unit 22 includes a microprocessor and a program memory (both not shown), and executes calculation processing and control processing, for example, required for functioning as the federated learning system 1. The central processing unit 22 executes predetermined computer programs 221 to 223. A part of the processing performed by a microprocessor executing the programs may be executed by another calculation device (for example, hardware, such as an ASIC and an FPGA). The program memory is a storage device which stores the programs executed by the microprocessor, and stores unalterable programs (for example, BIOS), and the like, and includes a ROM which is a non-volatile storage element and a RAM which is a high-speed and volatile storage element such as a dynamic random access memory (DRAM).

The control program 221 controls cooperative processing at the server 2 and each edge 3, and instructs and manages the processing from the server 2 to each edge 3.

The server key generation program 222 generates a common public key 241 from the edge public key of an edge key pair 341 acquired from the edge 3. Further, the server key generation program 222 generates a key pair 242 for decrypting to be used to decrypt an encrypted aggregated gradient 244 for decryption described later, and transmits the public key included in the key pair 242 for decryption to each edge 3.

The server encryption/decryption program 223 determines active edges, which are communicable edge, and generates an active encrypted aggregated gradient 243 from encrypted edge gradients 346 acquired from the active edges. Further, in order to determine an aggregated gradient 245, edges for decryption are selected from among the active edges, and the active encrypted aggregated gradient 243 and a reconstruction coefficient 347 of those edges are transmitted to the selected edges for decryption. Further, an edge switch share 348 is received from the edges 3 to be decrypted, the aggregated gradient 245 is generated from the edge switch share 348 and the secret key of the key pair 242 for decryption, and the generated aggregated gradient 245 is transmitted to each edge 3.

The communication control device 23 is a network interface device which controls communication to and from each edge 3 via the network 4.

The storage device 24 is, for example, a large-capacity and non-volatile storage device, such as a magnetic storage device (HDD) or a flash memory (SSD), and is a device which stores the data to be processed in the central processing unit 22, the data after the processing, and the like. The storage device 24 stores, for example, the common public key 241, the key pair 242 for decryption, the active encrypted aggregated gradient 243, the encrypted aggregated gradient 244 for decryption, and the aggregated gradient 245. The common public key 241 is generated by adding the public key of the edge key pair 341 acquired from each edge 3, and is used during encryption of the gradient of each edge 3. The key pair 242 for decryption is used during generation of the edge switch share 348 and during determination of the aggregated gradient 245 from the edge switch share 348. The active encrypted aggregated gradient 243 is generated from the encrypted edge gradients 346. The encrypted aggregated gradient 244 for decryption is used during determination of the aggregated gradient 245. The aggregated gradient 245 is used to generate an AI model 349 at each edge 3.

The programs executed by the central processing unit 22 are provided to the server 2 via removable media (for example, CD-ROM or flash memory) or the network 4, and are stored in a non-volatile program memory, which is a non-transitory storage medium. For this reason, the server 2 may include an interface for reading data from removable media.

The server 2 is a computer system physically built on one computer or built from a plurality of logically or physically built computers. The server 2 may also operate on a virtual computer built on a plurality of physical computer resources. For example, the control program 221, the server key generation program 222, and the server encryption/decryption program 223 may operate on individual physical or logical computers separate from each other, or a plurality of those programs may operate in combination on one physical or logical computer.

Figure 3:
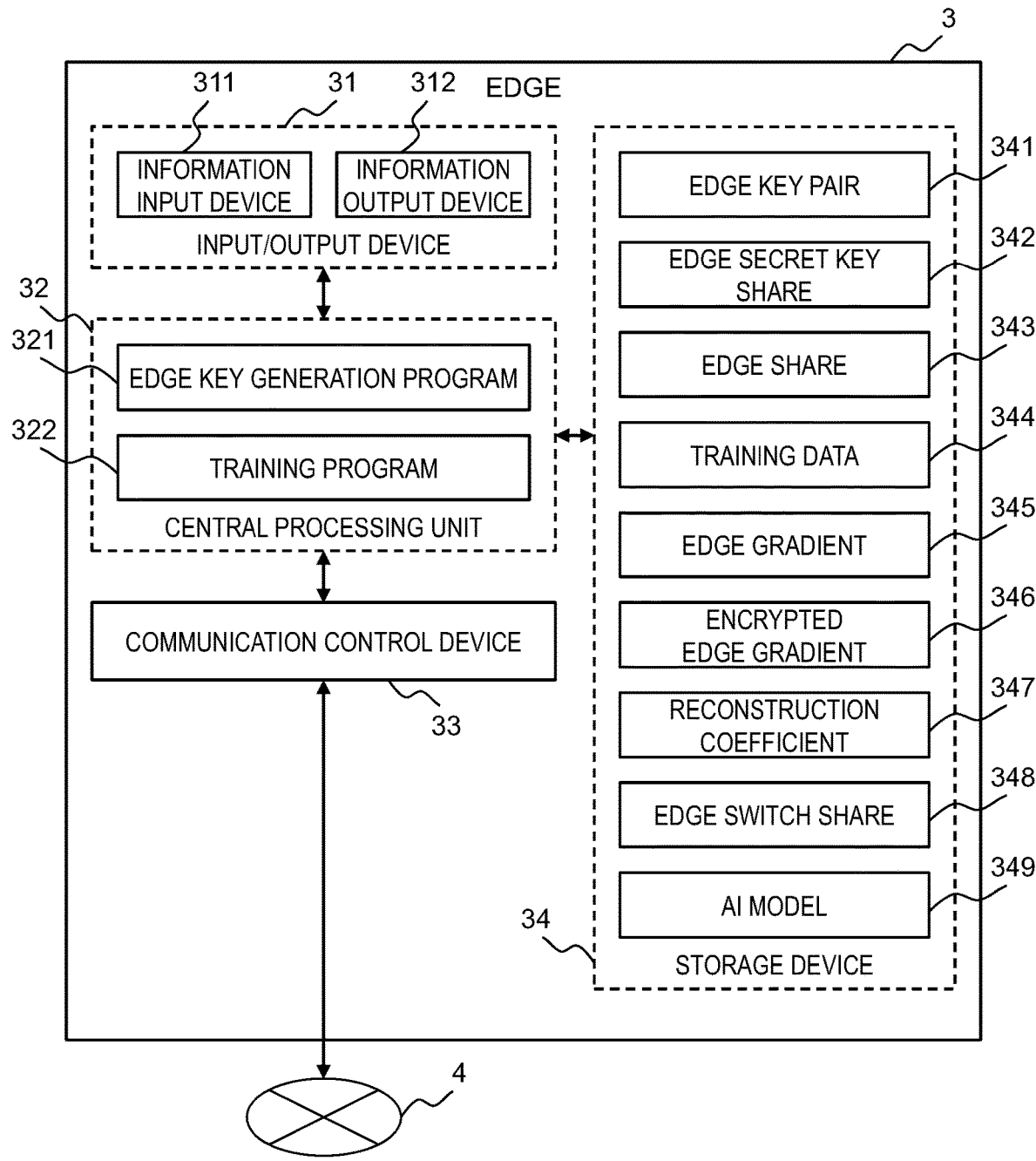
FIG. 3 is a block diagram for illustrating a configuration of an edge.

FIG. 3 is a block diagram for illustrating a configuration example of hardware and software of the edges 3.

Each edge 3 includes, for example, an input/output device 31, a central processing unit 32, a communication control device 33, and a storage device 34.

The input/output device 31 is a device which inputs and outputs information to and from a user. The input/output device 31 includes an information input device 311 and an information output device 312. Examples of the information input device 311 include a keyboard, a mouse, and a touch panel (none shown). Examples of the information output device 312 include a display and a printer (both not shown). The input/output device 31 may be a device which combines both an information input device and an information output device. The input/output device 31 may be a terminal coupled via a network to the edge 3. In this case, the edge 3 has a function of a web server. The terminal accesses the edge 3 by using a predetermined protocol (for example, http), and a web browser of the terminal implements a display function. In addition, the terminal may implement the display function by executing a dedicated application. The input/output device 31 may be an interface which outputs the results of calculations by the edge 3 to another computer system. In this way, the input/output device 31 can adopt various forms.

The central processing unit 32 includes a microprocessor and a program memory (both not shown), and executes calculation processing and control processing, for example, required for functioning as the federated learning system 1. The central processing unit 32 executes predetermined computer programs 321 and 322. A part of the processing performed by a microprocessor executing the programs may be executed by another calculation device (for example, hardware, such as an ASIC and an FPGA). The program memory is a storage device which stores the programs executed by the microprocessor, and stores unalterable programs (for example, BIOS), and the like, and includes a ROM which is a non-volatile storage element and a RAM which is a high-speed and volatile storage element such as a dynamic random access memory (DRAM).

The edge key generation program 321 generates an edge key pair 341 at each edge 3, generates an edge secret key share 342 from the secret key of the edge key pair 341, and generates an edge share 343 from the edge secret key share 342.

The training program 322 generates an edge gradient 345 by a process of machine learning of training data 344 at each edge 3, encrypts the generated edge gradients 345 by using the common public key 241 acquired from the server 2 to generate encrypted edge gradients 346, and transmits the generated encrypted edge gradients 346 to the server 2. Each edge 3 selected for decryption generates an edge switch share 348 and transmits the generated edge switch share 348 to the server 2. The server 2 generates the aggregated gradient 245 from the edge switch share 348 and the secret key of the edge key pair 341, and transmits the aggregated gradient 245 to each edge 3. The edges 3 execute processing of updating the AI model 349 based on the aggregated gradient 245 acquired from the server 2.

The communication control device 33 is a network interface device which controls communication to and from the server 2 and other edges 3 via the network 4.

The storage device 34 is, for example, a large-capacity and non-volatile storage device, such as a magnetic storage device (HDD) or a flash memory (SSD), and is a device which stores the data to be processed in the central processing unit 32, the data after the processing, and the like. The storage device 34 stores, for example, the edge key pair 341, the edge secret key share 342, the edge share 343, the training data 344, the edge gradient 345, the encrypted edge gradient 346, the reconstruction coefficient 347, the edge switch share 348, and the AI model 349. The edge key pair 341 is individually generated at each edge 3, and is constructed from a public key and a secret key. The public key is used to generate the common public key 241 on the server 2. The secret key is used to generate the edge secret key share 342. The edge secret key share 342 is used to generate the edge share 343. The edge share 343 is used to generate the edge switch share 348. The training data 344 is stored in the storage device 34 before processing starts, and is used to train the AI model 349. Each edge 3 usually has a different data set. The edge gradient 345 is data generated in the process of training the AI model 349. The encrypted edge gradient 346 is data obtained by encrypting the edge gradient 345 by the common public key 241 of the server 2. The reconstruction coefficient 347 is a value required for reconstructing the common secret key from the edge share 343 including the edge secret key share 342 (described later in Expression (2)). The reconstruction coefficient 347 is transmitted from the server 2, and is used to generate the edge switch share 348. The edge switch share 348 is generated based on the active encrypted aggregated gradient 243, the reconstruction coefficient 347, the edge secret key share 342, and the public key of the key pair 242 for decryption. The AI model 349 is updated based on the aggregated gradient 245 generated by aggregating in the server 2 the edge gradients 345 generated in the process of learning the training data 344 at each edge 3, and can be utilized for AI applications and the like.

The programs executed by the central processing unit 32 are provided to the edge 3 via removable media (for example, CD-ROM or flash memory) or a network, and are stored in a non-volatile program memory, which is a non-transitory storage medium. For this reason, the edge 3 may include an interface for reading data from removable media.

The edge 3 is a computer system physically built on one computer or built from a plurality of logically or physically built computers. The edge 3 may also operate on a virtual computer built on a plurality of physical computer resources. For example, the edge key generation program 321 and the training program 322 may operate on individual physical or logical computers separate from each other, or a plurality of those programs may operate in combination on one physical or logical computer.

<Outline of Processing to be executed in Federated Learning System>

An outline of processing of the federated learning system 1 is now described. When the control program 221 of the server 2 has instructed each edge 3 to start federated learning, the central processing unit 32 of each edge 3 activates the edge key generation program 321, generates an edge key pair 341, which is a public key encryption type key pair in homomorphic encryption of each edge 3, and stores the generated edge key pair 341 in the storage device 34. Each edge 3 transmits the public key of the edge key pair 341 to the server 2. Next, each edge 3 generates the edge secret key share 342 from the secret key of the edge key pair 341, and stores the generated edge secret key share 342 in the storage device 34. When each edge 3 has transmitted the edge secret key share 342 to the server 2, the server 2 transmits the edge secret key share 342 to the other edges 3. It should be noted that the transmission of the edge secret key share 342 to the other edges 3 may be performed directly between the edges 3 without going through the server 2. Next, each edge 3 generates the edge share 343 from the edge secret key share 342 by adding the received edge secret key shares 342 to the own edge secret key share 342, and stores the generated edge share 343 in the storage device 34.

The server key generation program 222 of the server 2 generates the common public key 241 from the public key of the edge key pair 341 acquired from each edge 3 and stores the generated common public key 241 in the storage device 24. Further, the server 2 transmits the common public key 241 to each edge 3. Next, the server 2 generates the key pair 242 for decryption, which is a public key encryption type key pair in homomorphic encryption to be used for decryption of the encrypted aggregated gradient 244 for decryption, and stores the generated key pair 242 for decryption in the storage device 24. The server 2 also transmits the public key of the key pair 242 for decryption to each edge 3.

Next, when a training processing instruction is received from the server 2, the central processing unit 32 of each edge 3 activates the training program 322 and performs machine learning based on the training data 344 stored in advance. At this point, the AI model 349 is stored in each edge 3, and the AI model 349 of each edge 3 is the same. Each edge 3 generates the edge gradient 345 in the process of training processing, stores the generated edge gradient 345 in the storage device 34, encrypts the edge grader 345 by using the common public key 241 to generate the encrypted edge gradient 346, and stores the generated encrypted edge gradient 346 in the storage device 34. Next, each edge 3 transmits the encrypted edge gradient 346 to the server 2.

When the encrypted edge gradient 346 of each edge 3 is received, the server encryption/decryption program 223 of the server 2 generates the active encrypted aggregated gradient 243 and stores the generated active encrypted aggregated gradient 243 in the storage device 24. At this time, the encrypted edge gradients 346 of the edges 3 from which there is no response are not used. Next, the server 2 confirms the edges 3 (active edges) that are the transmission sources of the encrypted edge gradients 346. In addition, the server 2 selects the edges for decryption, which are the edges 3 to be used when the active encrypted aggregated gradient 243 is decrypted from among the active edges. The active encrypted aggregated gradient 243 and the reconstruction coefficient 347 corresponding to the relevant edge 3 are transmitted to the selected edges for decryption.

The training program 322 of each edge for decryption receives the active encrypted aggregated gradient 243 and the reconstruction coefficient 347 from the server 2, and stores the reconstruction coefficient 347 in the storage device 34. Further, the training program 322 of each edge for decryption generates the edge switch share 348 from active encrypted aggregated gradient 243, the reconstruction coefficient 347, and the edge share 343 by using the public key of the key pair 242 for decryption, and stores the generated edge switch share 348 in the storage device 34. Moreover, the training program 322 of each edge for decryption transmits the edge switch share 348 to the server 2.

The server encryption/decryption program 223 of the server 2 generates the encrypted aggregated gradient 244 for decryption based on the edge switch share 348 received from each edge for decryption, and stores the generated encrypted aggregated gradient 244 for decryption in the storage device 24. The server 2 then generates the aggregated gradient 245 from the encrypted aggregated gradient 244 for decryption and the secret key of the key pair 242 for decryption, and stores the generated aggregated gradient 245 in the storage device 24. The server 2 also transmits the aggregated gradient 245 to each edge 3.

The training program 322 of each edge 3 updates the AI model 349 based on the aggregated gradient 245 received from the server 2. At this time, when a condition for ending the training is satisfied, the processing is ended, and when the condition for ending the training is not satisfied, the server 2 instructs each edge 3 to perform the training processing again.

<Key Generation Processing>

Figure 7:
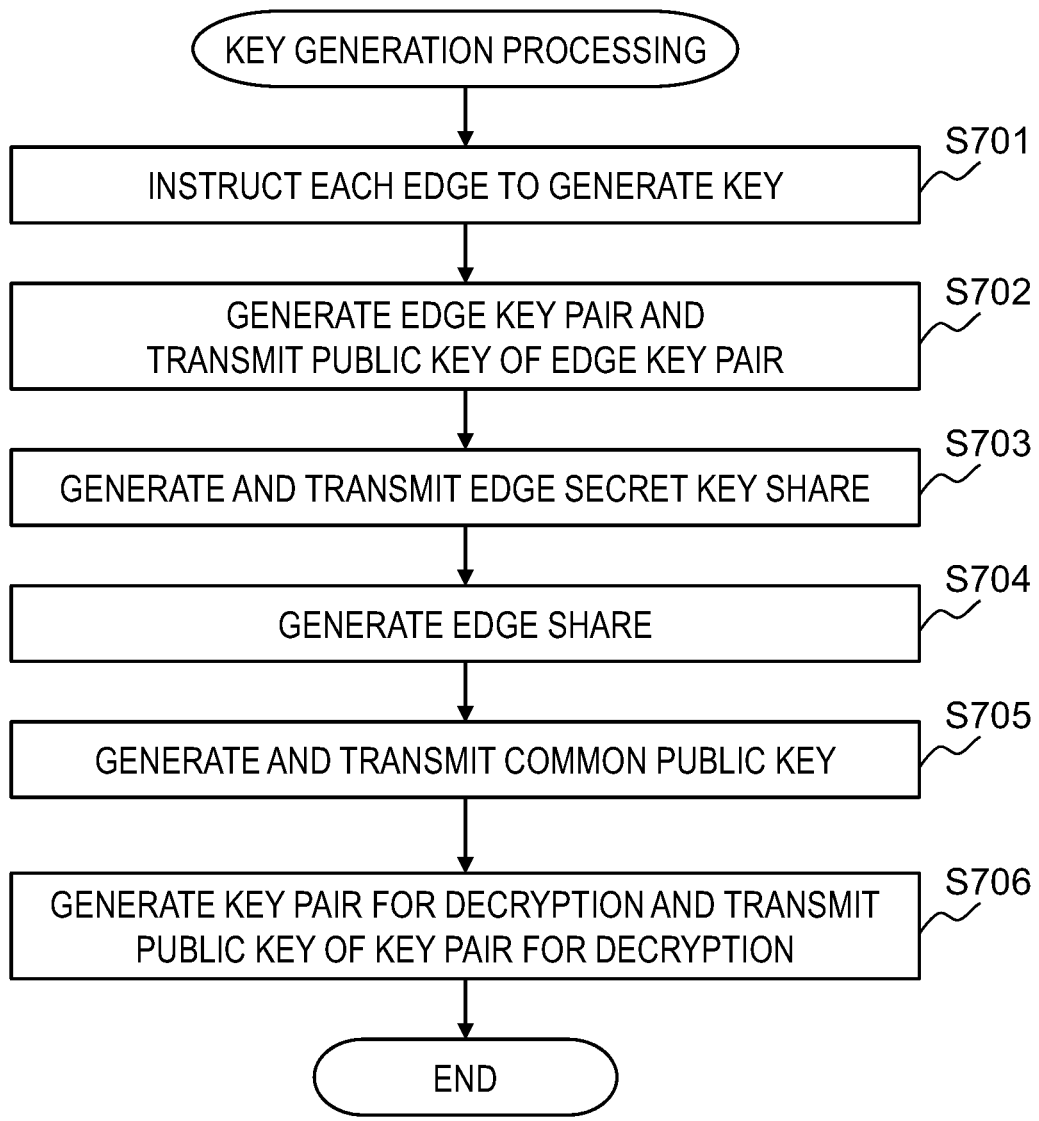
FIG. 7 is a flowchart of key generation processing.

FIG. 7 is a flowchart of key generation processing.

In Step S701, the control program 221 instructs each edge 3 to generate a key. There is now described an example like that illustrated in FIG. 4 in which there are four edges 3, namely, edges A to D. At the time of the key generation processing, all four edges 3 are in operation.

In Step S702, when each of the four edges 3 has received a key generation instruction, the edge key generation program 321 of each edge 3 generates the edge key pair 341, and transmits the public key of the edge key pair 341 to the server 2. When the server 2 has received the public key of the edge key pair 341 of each edge 3, the server key generation program 222 transmits the public key of each edge key pair 341 to each edge 3.

Figure 4:
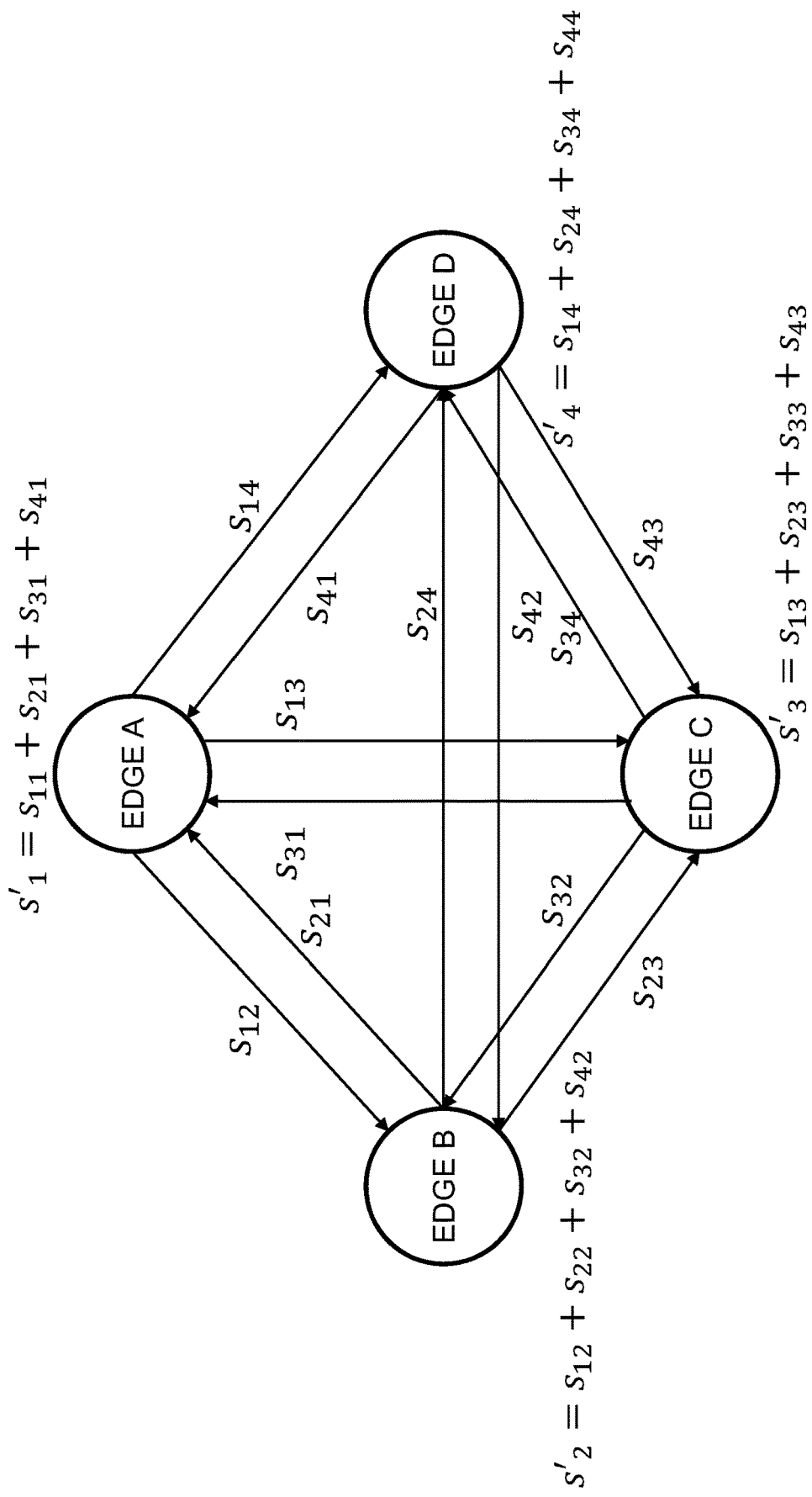
FIG. 4 is a diagram for illustrating an edge secret key sharing processing.

In Step S703, the edge key generation program 321 of each edge 3 generates the edge secret key share 342 from the secret key of the edge key pair 341 based on Shamir's secret sharing. Shamir's secret sharing is a technology proposed by Shamir et al. in 1979. In Shamir's secret sharing, secret information is split into a plurality of pieces of data called "shares." Each share is created such that the original secret information can be restored when a certain combination is achieved. The simplest method is the (k,n) threshold method. In the at least one embodiment, the following description is based on the (k,n) threshold method. In the (k,n) threshold method, shares are created such that the original secret information can be restored when, of "n" shares, the number of shares is equal to or more than a threshold value of "k". In other words, at k−1 or less shares, it is guaranteed that the original confidential information is not leaked. In FIGS. 4, s11, s12, s13, and s14 are each an edge secret key share 342 generated from the secret key of edge A. The secret key of edge A can be determined when the number of collected edge secret key shares 342 from among s11, s12, s13, and s14 is equal to or more than a certain threshold value. In the case of FIG. 4, s12 is transmitted to edge B, s13 is transmitted to edge C, and s14 is transmitted to edge D. As a result, the secret key of edge A is secretly distributed by a plurality of the edges 3. In other words, this means that by distributing and sharing the secret key shares among each of the edges 3, it is not required to use a TTP. When the edge secret key share 342 is transmitted to another edge 3, the edge secret key share 342 is encrypted by the public key of the edge key pair 341 of each edge 3 held in the server 2 and transmitted via the server 2. At the edge 3 that has received the edge secret key share 342, the edge secret key share 342 is decrypted by using the secret key of the edge key pair 341 of that edge 3. As a result, the edge secret key share 342 can be securely transmitted.

In Step S704, first, the edge key generation program 321 of each edge 3 generates the edge share 343 from the edge secret key share 342 based on Shamir's secret sharing. In FIG. 4, s'1, s'2, s'3, and s'4 are each an edge share 343. For example, s'1 can be calculated based on the sum of the edge secret key share s11 of edge A, the edge secret key share s12 of edge B, the edge secret key share s13 of edge C, and the edge secret key share s14 of edge D. Next, each edge share 343 is transmitted to the server 2. Each edge share 343 is constructed from a share of the secret key of each edge 3, and therefore information encrypted by the common public key 241 can be decrypted by aggregating a certain number or more of the edge shares 343. At this time, it is not required to send the secret key of the edge key pair 341 of each edge 3 outside the edges 3, and hence the edge gradient 345 at the edge 3 can maintain a confidential state.

Figure 5:
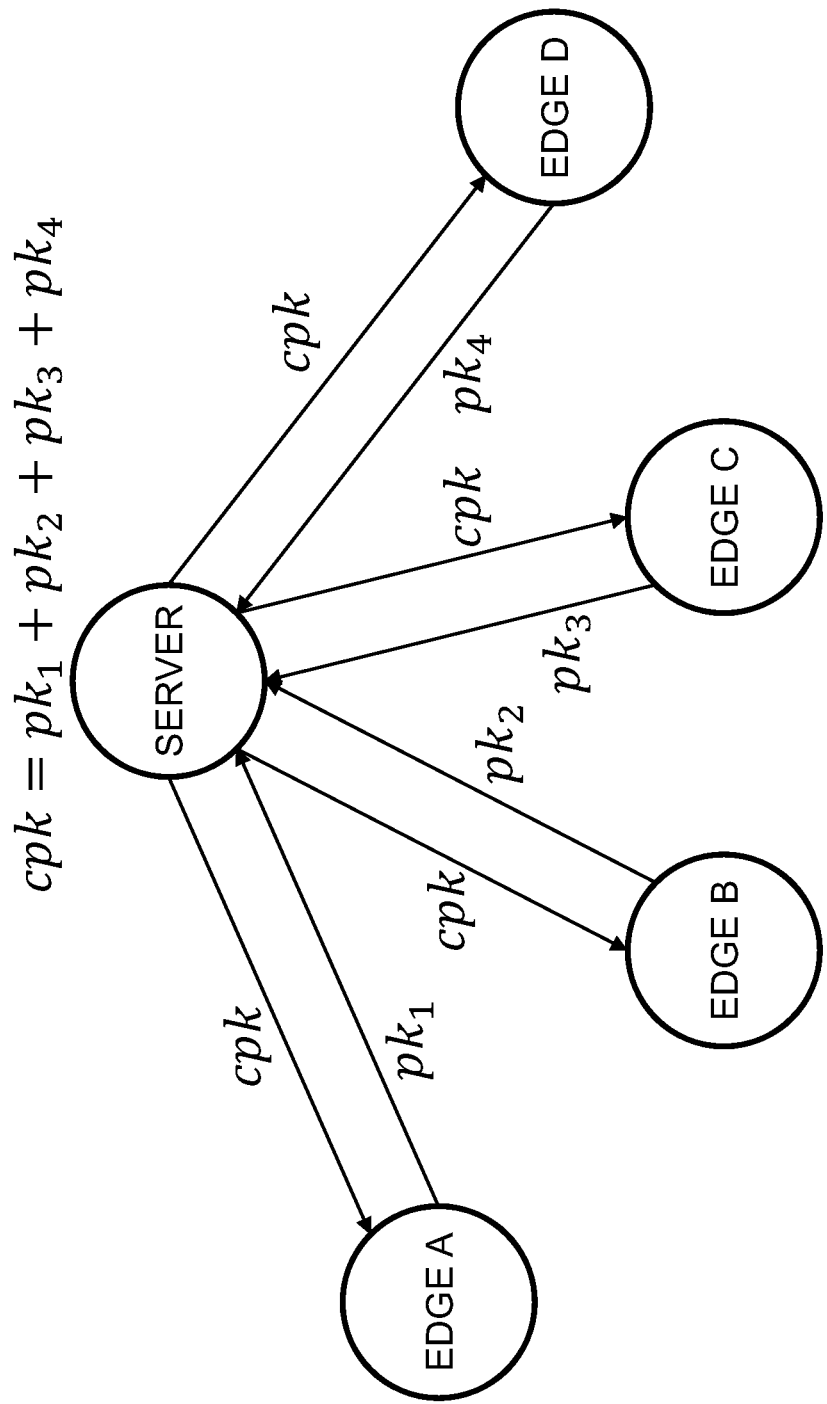
FIG. 5 is a diagram for illustrating a common public key generation processing.

As illustrated in FIG. 5, in Step S705, the server 2 generates a common public key (cpk) 241 from public keys pk1, pk2, pk3, and pk4 of the edge key pair 341 of each edge 3 received by the control program 221. For example, the common public key cpk can be generated based on the sum "pk1+pk2+pk3+pk4" of public keys. The common public key 241 is used during encryption of the edge gradient 345 at each edge 3. The generated common public key 241 is transmitted to each edge 3.

In Step S706, the server 2 generates the key pair 242 for decryption, which is a key pair in public key encryption, for decrypting the encrypted aggregated gradient 244 for decryption. The public key of the key pair 242 for decryption is transmitted to each edge 3.

<Training Processing>

Figure 8:
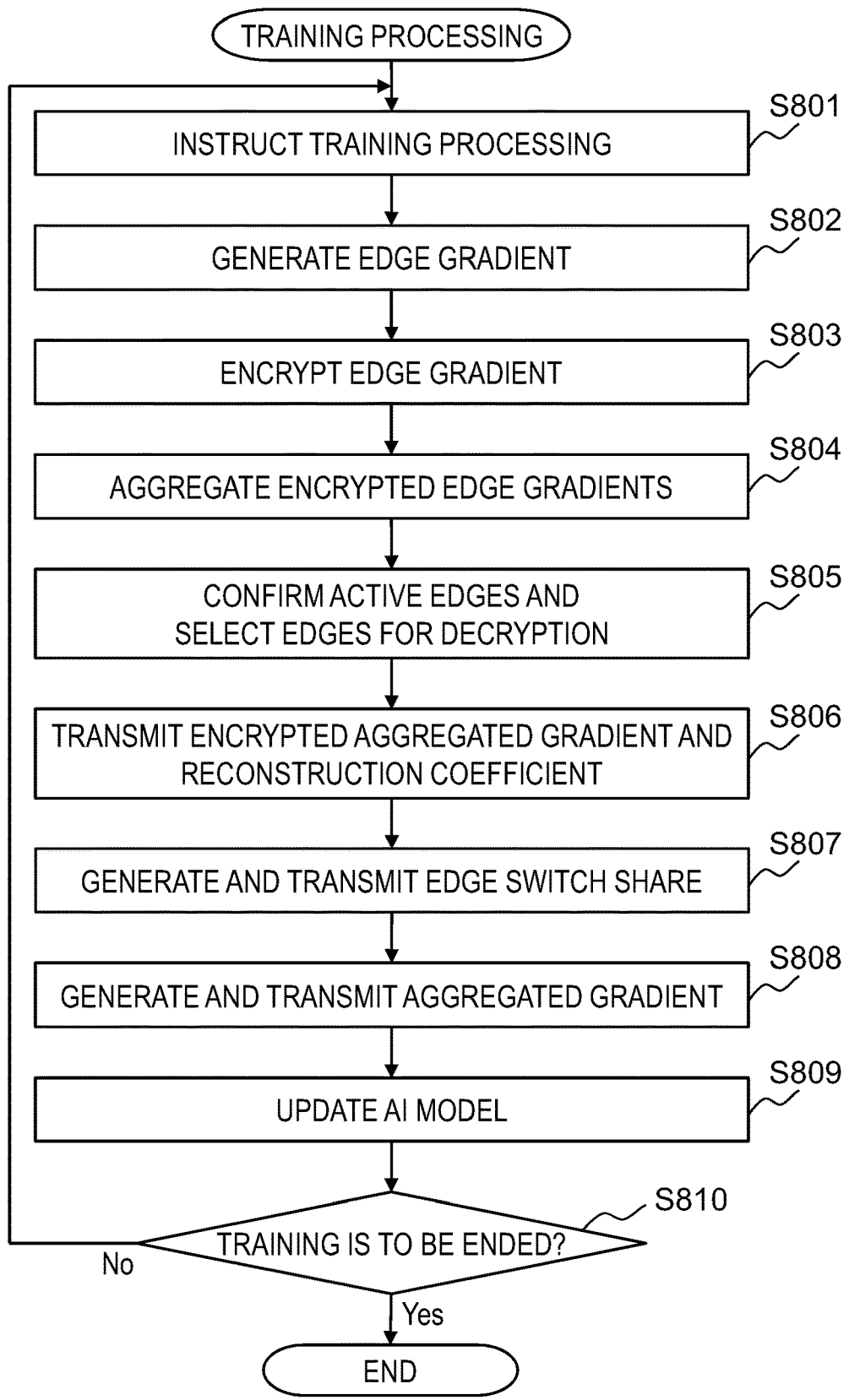
FIG. 8 is a flowchart of training processing.

FIG. 8 is a flowchart of training processing.

In Step S801, the control program 221 instructs each edge 3 to perform training processing. There is now described an example like that illustrated in FIG. 6 in which there are four edges 3, namely, edges A to D, as in the key generation processing. At this time, edge A, edge B, and edge C are active edges operating normally, and edge D is an inactive edge that is not operating normally due to a communication failure or a defect. In the at least one embodiment, through use of Shamir's secret sharing and homomorphic encryption, training can be continued even when a part of the edges 3 have become inactive edges during the training process.

In Step S802, when each edge 3 receives the training processing instruction, the training program 322 of each edge 3 reads the training data 344 and executes machine learning processing. The edge gradient 345 representing the gradient information to be used to update the AI model 349 in the process of the machine learning processing is output. At this time, when there is an inactive edge among the four edges 3, machine learning processing is not executed on the inactive edge 3. In other words, at edge D, machine learning processing is not executed at this time.

In Step S803, the training program 322 of each edge 3 encrypts the edge gradient 345 by using the public common key 241, generates the encrypted edge gradient 346, and transmits the generated encrypted edge gradient 346 to the server 2.

Figure 6:
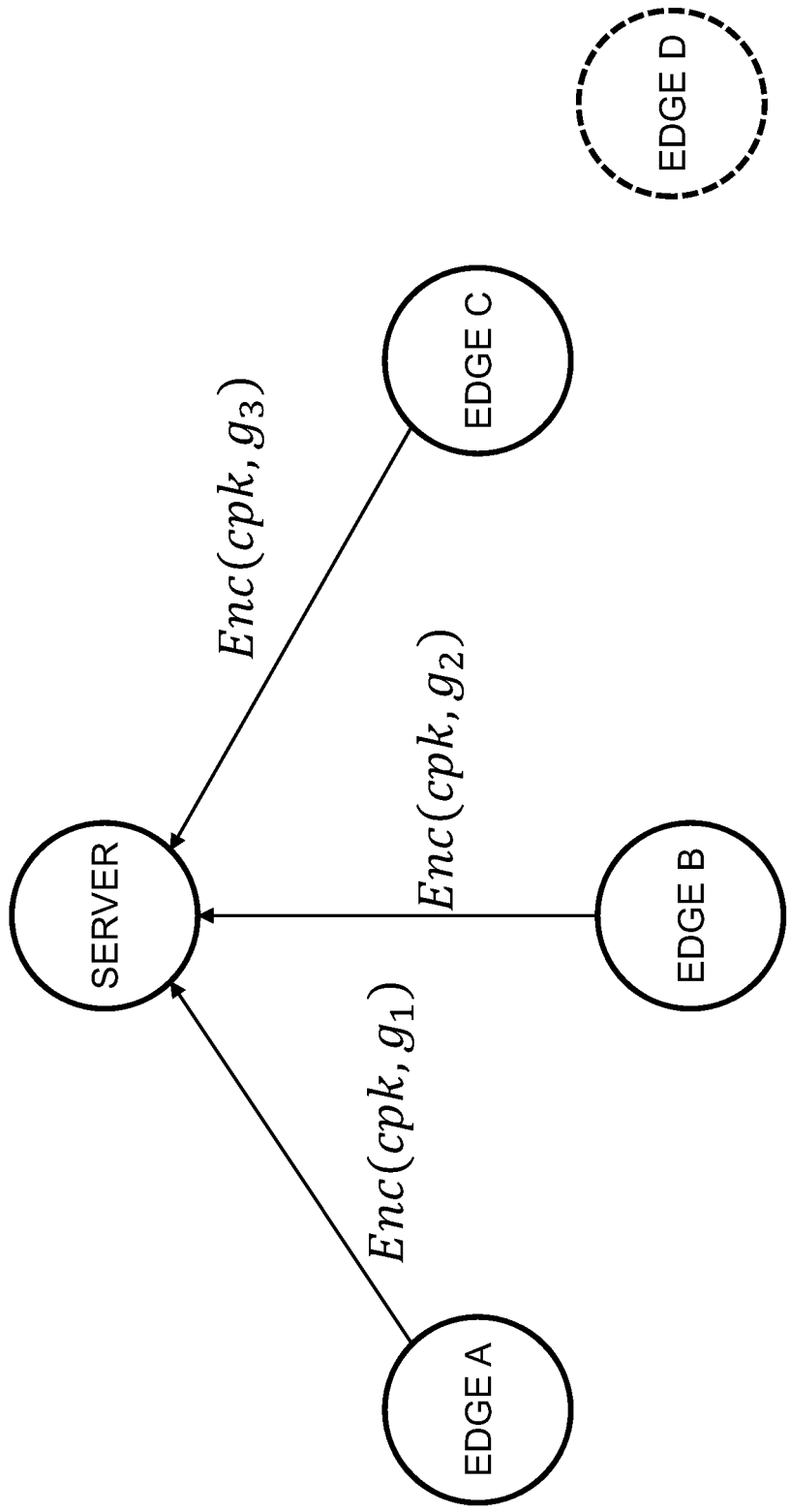
FIG. 6 is a diagram for illustrating an encrypted aggregated gradient generation processing.

In Step S804, the server encryption/decryption program 223 of the server 2 generates an active encrypted aggregated gradient 243 from the encrypted edge gradient 346 received from each edge 3. When the encryption of "x" by homomorphic encryption using the public key pk is represented as Enc(pk,x), by utilizing the property that "Enc(pk,x)+Enc(pk,y)=Enc(pk,x+y)," the sum of the encrypted edge gradient 346 of each edge 3 is equal to the result of encrypting the sum of each edge gradient 345. In the case of FIG. 6, edge A, edge B, and edge C are active edges, and therefore the active encrypted aggregated gradient (ct) 243 is generated based on the sum of the encrypted edge gradients 346 collected from those three edges 3, that is, $$Enc(cpk,g1)+Enc(cpk,g2)+Enc(cpk,g3)=Enc(cpk,g1+g2+g3).$$

Figure 9:
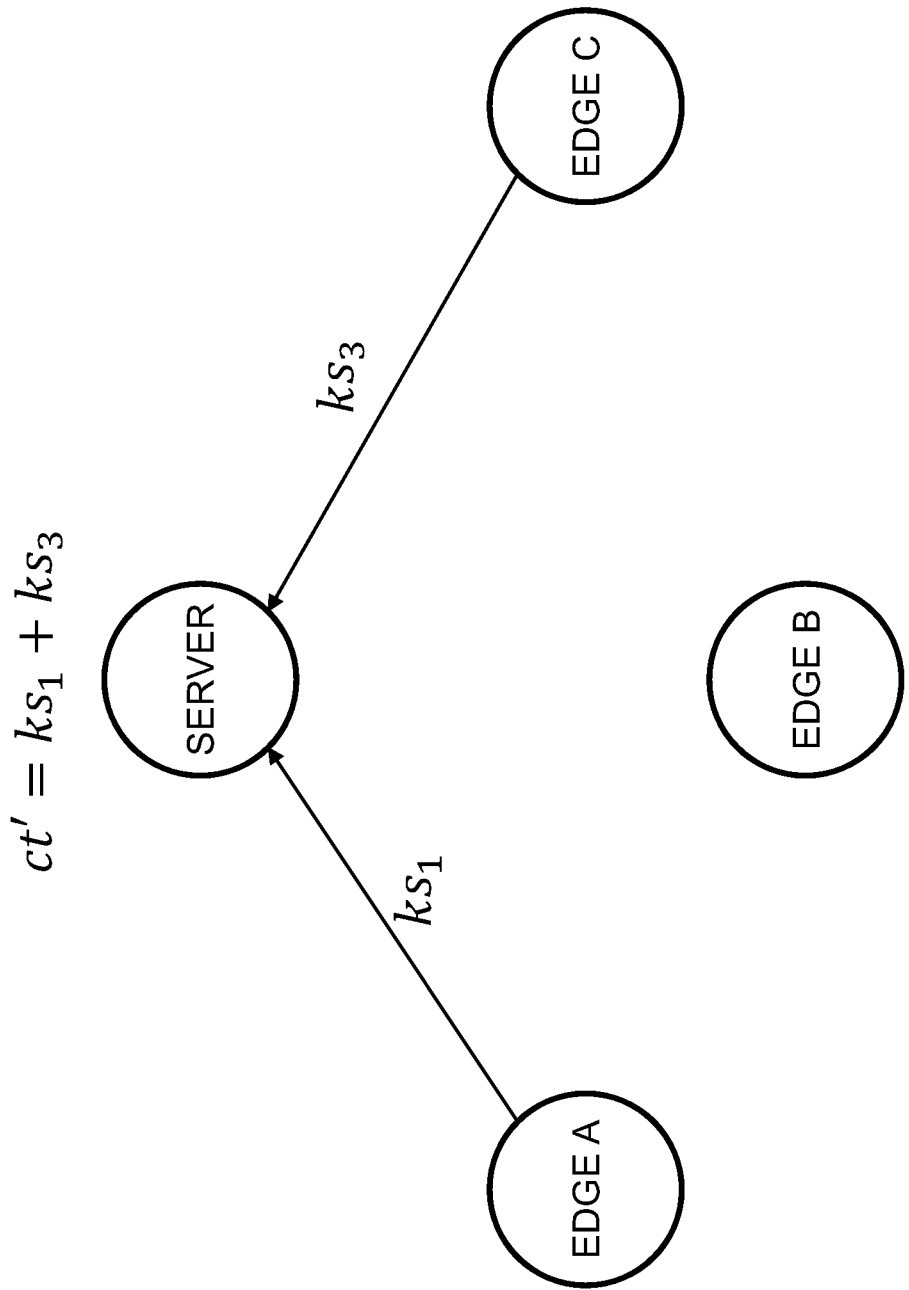
FIG. 9 is a diagram for illustrating an encrypted aggregated gradient for decryption generation processing.

In Step S805, the server encryption/decryption program 223 of the server 2 confirms the active edges. In the case illustrated in FIG. 6, edge A, edge B, and edge C are the active edges. Further, the active edges to be used to decrypt the active encrypted aggregated gradient 243 are selected. For example, as illustrated in FIG. 9, edge A and edge C are selected as the edges to be used for decryption. At each active edge, in order to determine the aggregated gradient 245 required to update the AI model 349, it is required to decrypt the active encrypted aggregated gradient 243, and the decryption requires the common secret key corresponding to the common public key 241 used during encryption. However, the common secret key is not determinable. This is because in order to generate the common secret key, it is required to aggregate the secret key of the edge key pair 341 of each edge 3 in the server 2. However, in that case, the edge gradient 345 of each edge 3 can be acquired by the server 2, and the confidentiality of the edge gradient 345 is lost. Consequently, the secret key of the edge key pair 341 of each edge 3 is held only by the relevant edge 3. Therefore, in the at least one embodiment, the aggregated gradient 245 is determined by Shamir's secret sharing, without using a common secret key. In the at least one embodiment, there is described below a case in which the threshold value, which is the number required for decryption, in Shamir's secret sharing is 2. When the threshold value is 2, the active encrypted gradient 243 can be decrypted by using the edge switch share 348 (described later) collected from any two edges 3 from among the active edges. In the at least one embodiment, there is described an example in which edge A and edge C are selected as the edges 3 to be used for decryption (hereinafter also referred to as "decryption edges").

In Step S806, the server encryption/decryption program 223 of the server 2 transmits the active encrypted aggregated gradient 243 and the reconstruction coefficient 347 corresponding to the relevant edges 3 to the edges for decryption (edge A and edge C). The reconstruction coefficient 347 corresponding to each edge for decryption is determined from a Vandermonde matrix for edge A and edge C, which are the edges for decryption.

In Step S807, the training program 322 of each decryption edge generates edge switch shares (ks1 and ks3) 348 from the active encrypted aggregated gradient 243, the reconstruction coefficient 347, the edge share 343, and the public key of the key pair 242 for decryption, and transmits the generated edge switch shares (ks1 and ks3) 348 to the server 2. The purpose of generating the edge switch shares 348 is now described. In order to decrypt the active encrypted aggregated gradient 243, in most cases, the common secret key paired with the common public key 241 used during encryption is required. Simply generating the common secret key means that not only the active encrypted aggregated gradient 243 can be decrypted, but the encrypted edge gradient 346 can also be decrypted, and as a result, the confidentiality of the edge gradient 345 is lost. Therefore, the edge switch shares 348 are generated and encrypted by the public key of the key pair 242 for decryption including the edge share 343 required for decrypting the active encrypted aggregated gradient 243 at the time of generation. As described above, the edge share 343 is constructed from a share of the secret key of each edge 3. For this reason, through aggregation of the edge switch shares 348 generated from the edge share 343 and decryption by the secret key of the key pair 242 for decryption, the active encrypted aggregated gradient 243 can be decrypted without generating the common secret key. As a result, the active encrypted aggregated gradient 243 can be decrypted while maintaining the confidentiality of the edge gradient 345. Details of the method of generating the edge switch shares 348 are described later.

In Step S808, when the server 2 has received the edge switch shares (ks1 and ks3) 348 from each edge for decryption, the server encryption/decryption program 223 generates an encrypted aggregated gradient (ct') 244 for decryption from the received edge switch shares 348. In the at least one embodiment, the edge switch shares ks1 and ks3 are added to generate encrypted aggregated gradient ct' for decryption. Next, the aggregated gradient 245 is determined from the encrypted aggregated gradient 244 for decryption and the secret key of the key pair 242 for decryption. Next, the aggregated gradient 245 is transmitted to all edges 3. At this time, when a part of the edges are not communicable, the server 2 halts the processing until all edges 3 can receive data. Further, it is better to accumulate information on the edges 3 which are not communicable, and at the timing of updating the AI model 349 in Step S809, transmit past aggregated gradients 245 in order, and apply those past aggregated gradients 245 to the AI model 349 of each edge 3. As a result, the AI model 349 of all edges 3 can always be kept the same.

The processing steps of Step S807 and Step S808 are now described in more detail. The edge switch shares 348 include the edge share 343 of each edge 3 that is an element of the common secret key corresponding to the common public key 241 used when the active encrypted aggregated gradient 243 is generated and the reconstruction coefficient 347 corresponding to the relevant edge share 343. Therefore, when the number of active edges is equal to or more than the threshold value "k" described above, the aggregated gradient 245 can be determined without the common secret key.

In a more specific description, the active encrypted aggregated gradient 243 is ct=(c0, c1), the encrypted aggregated gradient 244 for decryption is ct', the common secret key is "s", the reconstruction coefficient 347 of an edge "i" is ri, the edge share 343 of the edge "i" is s'i, the public key of the key pair 242 for decryption is tpk=(p'0, p1), the secret key of the key pair 242 for decryption is tsk, the set of all edges 3 is P, and the edge switch shares 348 of each edge for decryption is ksi=(h0, i,h1, i).

As described above, in order to determine the aggregated gradient 245, the common secret key corresponding to the common public key 241 is required, but the common secret key is not usable. Therefore, as on the left side of Expression (1), it can be considered to generate the encrypted aggregated gradient (ct') 244 for decryption by adding only the edge switch shares 348 of the edges for decryption, and decrypting by the secret key tsk of the key pair 242 for decryption. It should be noted that BFV.Decrypt(sk,x) represents the decryption of "x" by the secret key sk in the homomorphic encryption scheme BFV.

$$BFV.Decrypt(tsk, ct') = BFV.Decrypt\left(\sum_{i \in P} s_i, ct\right) \quad (1)$$

This means that when the encrypted aggregated gradient (ct') 244 for decryption is decrypted by the secret key tsk of the key pair 242 for decryption, as a result of decrypting the active encrypted aggregated gradient (ct) 243 by "s", the aggregated gradient 245 can be obtained. Therefore, first, the processing of determining the encrypted aggregated gradient (ct') 244 for decryption is performed. In order to determine the encrypted aggregated gradient (ct') 244 for decryption, first, the edge switch shares (ksi) 348 are determined based on Shamir's secret sharing from the following Expression (2). In the expression, ui is a value generated by random sampling, and e0, "i", e1, and "i" are values sampled based on an RLWE noise distribution. In other words, Expression (2) indicates that the edge switch shares (ksi) 348 are generated from ct, ri, tpk, and s'i.

$$(h_{0,i}, h_{1,i}) = (r_i s'_i + u_i p'_0 + e_{0,i}, u_i p'_i + e_{1,i}) \quad (2)$$

In the server 2, the encrypted gradient (ct') 244 for decryption is determined from the edge switch shares (ksi) 348 collected from each edge for decryption by the following Expression (3).

$$ct' = (c_0 + \Sigma_i h_{0,i}, \Sigma_i h_{1,i}) \qquad (3)$$

Finally, the server 2 can determine the aggregated gradient 245 by decrypting the encrypted gradient (ct') 244 for decryption by the secret key of the key pair 242 for decryption. The edge switch shares 348 are encrypted by the common public key 241 and the public key tpk of the key pair 242 for decryption, and therefore by decrypting the encrypted gradient (ct') 244 for decryption obtained by collecting the edge switch shares 348, the common secret key can be constructed from the term $\Sigma_i h_{0,i}$ of Expression (3), and the encryption is also decrypted by the common public key 241. In this way, the aggregated gradient 245 can be determined in the server 2 without sending the secret key of the edge key pair 341 at each edge 3 outside the edges 3 and without extracting only the common secret key.

In Step S809, at each edge 3, the training program 322 updates the AI model 349 based on the aggregated gradient 245 received from the server 2. As described in Step S808, in the at least one embodiment of this invention, even when a part of the edges 3 are not communicable at the time of Step S808, it is possible to maintain an identical AI model 349 to be identical by later transmitting the aggregated gradient 245. Further, when it is not required to maintain the AI model 349 to be identical, for the edges 3 that are not communicable, the aggregated gradient 245 transmitted at that timing may be discarded.

In Step S810, the training program 322 of each edge 3 determines whether or not to end the training. When the training is not to be ended, the process returns to Step S801. When the training is to be ended, the processing is ended. Various means can be applied to perform the determination regarding whether or not the training is to be ended. For example, a determination to end the training can be performed when a value output by a loss function used in the machine learning becomes a fixed value or less.

In the at least one embodiment, gradients can be added in the federated learning, and therefore the additive property of homomorphic encryption is utilized, but applications utilizing the multiplicative property of homomorphic encryption can also be adopted.

As described above, in the federated learning system 1 according to the at least one embodiment, the edge 3 includes an edge key generation module (edge key generation program 321) which generates an edge key pair 341 including an edge public key and an edge secret key, and a training module (training program 322) which trains an AI model 349 by using training data 344. A server 2 includes a server key generation module (server key generation program 222) which generates a key pair 242 for decryption including a public key for decryption and a secret key for decryption, and an encryption/decryption module (server encryption/decryption program 223) which executes data processing. The training program 322 transmits an encrypted edge gradient 346 obtained by encrypting an edge gradient 345 representing a result of training of the AI model 349 by a common public key to the server 2. The server encryption/decryption program 223 generates an active encrypted aggregated gradient 243 by adding encrypted edge gradients 346 received from a plurality of edges 3, and transmits the generated active encrypted aggregated gradient 243 to the edge 3. The training program 322 generates an edge switch share 348 in which the active encrypted aggregated gradient 243 is encrypted, and transmits the generated edge switch share 348 to the server 2. The server encryption/decryption program 223 generates an encrypted aggregated gradient 244 for decryption by adding the edge switch shares 348 received from a plurality of edges 3, generates an aggregated gradient 245 by using a secret key of a key pair 242 for decryption to decrypt the encrypted aggregated gradient 244 for decryption, and transmits the generated aggregated gradient 245 to the edge 3. The training program 322 trains the AI model 349 by using the aggregated gradient 245 received from the server 2. Consequently, the gradient information on each edge 3 can be aggregated in the server 2 without using a TTP and while maintaining confidentiality, and an AI model 349 that considers the training data 344 of each edge 3 can be generated. Further, it is not required to transmit the secret key of each edge 3 to the outside, and hence the gradient information on each edge 3 can be decrypted by only the relevant edge 3, and confidentiality can be improved compared with when a TTP is used. Moreover, during the training of the AI model 349, each edge 3 communicates to and from only the server 2, and hence communication costs can be reduced. In addition, the training processing can be continued even when a part of the edges 3 have become inoperable during the training processing.

Further, the result of adding the encrypted edge gradients 346 is equal to the result of adding and encrypting the edge gradients 345, and hence the edge gradients 345 can be aggregated while maintaining confidentiality by encryption.

Further, the edge key generation program 321 generates an edge secret key share of 342 from the secret key of the generated edge key pair 341 based on Shamir's secret sharing, and generates an edge share 343 by adding edge secret key shares generated by a plurality of edges 3 (for example, the edge secret key share generated by the own edge 3 and the edge secret key share generated by another edge 3), and hence it is not required to transmit the secret key of each edge 3 to the outside. Consequently, the gradient information on each edge 3 can be decrypted only by the relevant edge 3, and confidentiality can be improved compared with when a TTP is used.

Further, the edge key generation program 321 generates the edge secret key share 342 from the secret key based on Shamir's secret sharing, and generates the edge share 343 by adding edge secret key shares 342 generated by a plurality of edges 3, and hence, without publicly disclosing the edge secret key, the key can be distributed and managed by a plurality of edges, and confidentiality can be improved compared with when a TTP is used.

Further, the training program 322 generates the edge switch share 348 by using a public key tpk of a key pair for decryption to encrypt the active encrypted aggregated gradient 243, the edge share 343, and the reconstruction coefficient 347. Consequently, an element capable of reconstructing the common secret key can be distributed and managed by a plurality of edges, the confidentiality of the common secret key can be guaranteed, and the gradient information on each edge 3 can be kept confidential.

Further, the server encryption/decryption program receives an edge switch share 348 from a predetermined number (for example, a threshold value "k" in the (k,n) threshold method) or more of edges 3, generates the encrypted aggregated gradient 244 for decryption by adding the received edge switch shares 348, generates the aggregated gradient 245 by using the secret key of the key pair 242 for decryption to decrypt the generated encrypted aggregated gradient 244 for decryption, and transmits the aggregated gradient 245 to the edge 3 which has transmitted the edge switch share. Consequently, training processing can be continued even when a part of the edges are inoperable.

Further, in the processing of decrypting the generated decryption encrypted aggregated gradient 244 for decryption, the server encryption/decryption program constructs a common secret key and generates the aggregated gradient 245 by aggregating the edge gradients 345 by decrypting the encryption by using the common public key. Therefore, without sending the common secret key to the outside, the aggregated gradient 245 can be generated by decrypting the encrypted aggregated gradient ct' (244) for decryption generated by aggregating edge gradients 346 encrypted by the common public key, the confidentiality of the common secret key can be guaranteed, and the gradient information on each edge 3 can be kept confidential.

It should be noted that this invention is not limited to the above-mentioned at least one embodiment, and encompasses various modification examples and equivalent configurations within the gist of the appended claims. For example, the above-mentioned at least one embodiment is described in detail for a better understanding of this invention, and this invention is not necessarily limited to what includes all the configurations that have been described. Further, a part of the configurations of a given embodiment may be replaced by the configurations of another embodiment. Further, the configurations of another embodiment may be added to the configurations of a given embodiment. Further, a part of the configurations of each embodiment may be added to, deleted from, or replaced by another configuration.

Further, a part or entirety of the respective configurations, functions, processing modules, processing means, and the like that have been described may be implemented by hardware by, for example, being designed as an integrated circuit, or may be implemented by software by a processor interpreting and executing programs for implementing the respective functions.

The information, such as the programs, tables, and files, for implementing the respective functions can be stored in a storage device, such as a memory, a hard disk drive, or a solid state drive (SSD), or in a recording medium, such as an IC card, an SD card, or a DVD.

Further, control lines and information lines that are assumed to be required for the sake of description are illustrated, but not all the control lines and information lines that are required in terms of implementation are illustrated. It may be considered that almost all the components are connected to one another in actuality.

What is claimed is:

1. A federated learning system for aggregating gradient information representing a result of training an Artificial Intelligence (AI) model, the federated learning system comprising:
    a plurality of edges devices, wherein each of the plurality of edge devices includes one or more processors that are collectively configured to:
    generate an edge key pair including an edge public key and an edge secret key,
    generate an encrypted gradient by encrypting edge gradient information with a common public key,
    transmit the encrypted gradient to a server,
    generate an edge switch share based on an active encrypted aggregate gradient received from the server and transmit the edge switch share to the server,
    receive an aggregate gradient, and
    train the AI model by using training data and the aggregate gradient; and
    a server that is communicatively coupled to the plurality of the edge devices, wherein the server includes one or more processors that are collectively configured to:
    collect encrypted gradients from a plurality of the edge devices and generate the active encrypted aggregate gradient based on the encrypted gradients,
    transmit the active encrypted gradient information to the plurality of edge devices,
    generate a key pair for decryption including a public key for decryption and a secret key for decryption,
    generate an encrypted aggregated gradient based on edge switch shares received from the plurality of the edge devices,
    generate the aggregated gradient by decrypting the generated encrypted aggregated gradient using the secret key for decryption, and
    transmit the aggregated gradient to the plurality of the edge devices.

2. The federated learning system according to claim 1, wherein:
    the encrypted gradient is generated using homomorphic encryption encrypting gradient information indicating a training result of an edge device, and
    a respective result of adding the encrypted gradient of each of the plurality of edge devices is equal to a respective result of adding and encrypting gradients generated by the plurality of the edge devices.

3. The federated learning system according to claim 1, wherein the one or more processors of each of the plurality of edge devices are further collectively configured to:
    generate an edge secret key share from the generated edge secret key based on Shamir's secret sharing; and
    generate an edge share by adding edge secret key shares generated by the plurality of the edge devices.

4. The federated learning system according to claim 3, wherein a reconstruction coefficient, which is a value required for reconstructing a common secret key from the edge share, is defined, and
    wherein the one or more processors of each of the plurality of edge devices are further collectively configured to:
    generate the edge switch share by using the public key for decryption to encrypt the active encrypted aggregated gradient, the edge share, and the reconstruction coefficient.

5. The federated learning system according to claim 4, wherein the one or more processors of the server are further collectively configured to:
    receive the edge switch shares from a predetermined number or more of plurality of the edge devices;
    generate the encrypted aggregated gradient for decryption by adding the received edge switch shares;
    generate the aggregated gradient by using the secret key for decryption to decrypt the generated encrypted aggregated gradient for decryption; and
    transmit the aggregated gradient to the predetermined number or more of the plurality of edge devices which have transmitted the edge switch shares.

6. The federated learning system according to claim 5, wherein one or more processors of the server are further collectively configured to:
    construct a common secret key during the process of decrypting the generated encrypted aggregated gradient, and generate the aggregated gradient by decrypting the encrypted aggregated gradient by using the constructed common secret key.

7. A federated learning method for aggregating gradient information representing a result of training an Artificial Intelligence (AI) model the federated learning method comprising:

generating, by each edge device among a plurality of edge devices, an encrypted gradient by encrypting gradient information with common public key;

generating, by a server, an active encrypted aggregated gradient based on encrypted gradients received from a plurality of edge devices;

transmitting, by the server, the active encrypted aggregated gradient to the plurality of the edge devices;

generating, by each edge device, an edge switch share based on the active encrypted aggregate gradient received from the server;

transmitting, by each edge device, the edge switch share to the server;

generating, by the server, an encrypted aggregated gradient based on edge switch shares received from the plurality of the edge devices, generating, by the server, an aggregated gradient by decrypting the encrypted aggregated gradient using a secret key for decryption generated by the server;

transmitting, by the server, the aggregated gradient to the edge device; and training, by the edge device, the AI model by using the aggregated gradient received from the server.

\* \* \* \* \*